United States Patent
Ng et al.

(10) Patent No.: US 7,806,938 B2
(45) Date of Patent: Oct. 5, 2010

(54) SECURITY POWER CONTROL

(75) Inventors: Eng Yeow Ng, Penang (MY); Ze-Yng Cheong, Penang (MY); Choon Hooi Khor, Kedah (MY)

(73) Assignee: Intel Corporation, Santa Clara, CA (US)

( * ) Notice: Subject to any disclaimer, the term of this patent is extended or adjusted under 35 U.S.C. 154(b) by 984 days.

(21) Appl. No.: 11/154,767

(22) Filed: Jun. 16, 2005

(65) Prior Publication Data

US 2006/0288428 A1  Dec. 21, 2006

(51) Int. Cl.
G06F 21/00 (2006.01)
G06F 11/30 (2006.01)
H03K 17/62 (2006.01)

(52) U.S. Cl. .......................... 726/35; 726/36; 713/300; 340/572.9

(58) Field of Classification Search ................ 713/300, 713/310, 324, 340; 726/34, 36; 340/500, 340/524, 532, 572.9, 14.62–14.65
See application file for complete search history.

(56) References Cited

U.S. PATENT DOCUMENTS

| | | | |
|---|---|---|---|
| 5,406,261 A | | 4/1995 | Glenn et al. |
| 5,712,973 A | * | 1/1998 | Dayan et al. ................... 726/36 |
| 5,760,690 A | | 6/1998 | French |
| 5,872,515 A | | 2/1999 | Ha et al. |
| 5,949,882 A | * | 9/1999 | Angelo ....................... 713/185 |
| 6,119,237 A | * | 9/2000 | Cho ............................ 713/300 |
| 6,166,688 A | | 12/2000 | Cromer et al. |
| 7,024,700 B1 | * | 4/2006 | Horikoshi et al. ............. 726/34 |
| 2002/0188866 A1 | * | 12/2002 | Ca et al. ...................... 713/201 |
| 2004/0051647 A1 | | 3/2004 | Chen |
| 2004/0151026 A1 | * | 8/2004 | Naso et al. ............. 365/185.04 |
| 2005/0065661 A1 | * | 3/2005 | Hirose et al. ................ 700/286 |
| 2005/0104452 A1 | * | 5/2005 | Wallerstrom ............... 307/10.1 |
| 2006/0005264 A1 | * | 1/2006 | Lin et al. ....................... 726/35 |

FOREIGN PATENT DOCUMENTS

| | | |
|---|---|---|
| EP | 0436963 A2 | 7/1991 |
| EP | 556848 A2 | 8/1993 |
| GB | 2400453 | 10/2004 |

OTHER PUBLICATIONS

"MicroSaver Secure Computer Equipment with Patented Technology", http://www.microsaver.com/html/2220.html, (Jun. 9, 2005), 1 page.

Office Action received for Chinese Patent Application No. 200680020633.2, mailed on Feb. 5, 2010, 5 pages of Office Action and 4 pages of English Translation.

Office Action received for Chinese Patent Application No. 2006800206332, mailed on Aug. 21, 2007, 7 pages of Office Action Inclusive of English Translation.

(Continued)

*Primary Examiner*—Gilberto Barron, Jr.
*Assistant Examiner*—Abdulhakim Nobahar
(74) *Attorney, Agent, or Firm*—Caven & Aghevli LLC

(57) ABSTRACT

A method and apparatus are described that control the supply of electrical power to one or more components of a computing device. Other embodiments are described and claimed.

20 Claims, 4 Drawing Sheets

OTHER PUBLICATIONS

Office Action received for Chinese Patent Application No. 2006800206332, mailed on Feb. 6, 2009, 11 pages of Office Action Inclusive of English Translation.

Office Action received for German Patent Application No. 112006001216.9-53, mailed on Sep. 16, 2009, 4 pages of Office Action inclusive of English Translation.

Office Action received for German Patent Application No. 112006001216.9-53, mailed on Jul. 11, 2008, 5 pages of Office Action inclusive of English Translation.

Office Action and Search Report for Taiwanese Patent Application No. 95121602, mailed on Nov. 12, 2009, 19 pages inclusive of English Translation.

* cited by examiner

SECURITY POWER CONTROL

BACKGROUND

Notebook computers, also referred to as laptop computers, are lightweight personal computers, which are quickly gaining popularity. Popularity of laptop computers has been increasing, in part, because their prices have been dropping steadily, while maintaining similar performance as their larger siblings (i.e., desktop computers or workstations).

One attraction of notebook computers is their ease of portability. Their portability, however, exposes them to potential theft. Laptop theft may be catastrophic for the victim. Not only a relatively expensive piece of equipment is lost, but the owner may also lose any data that he or she has stored on the stolen laptop.

Physical locks may be used to secure laptop to obstacles. Such locks rely on a user to ensure that a laptop is locked. Users, however, may forget to lock their laptops, resulting in a theft.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, some embodiments may be practiced without the specific details. In other instances, well-known methods, procedures, components, and circuits have not been described in detail so as not to obscure the particular embodiments.

Figure 1:
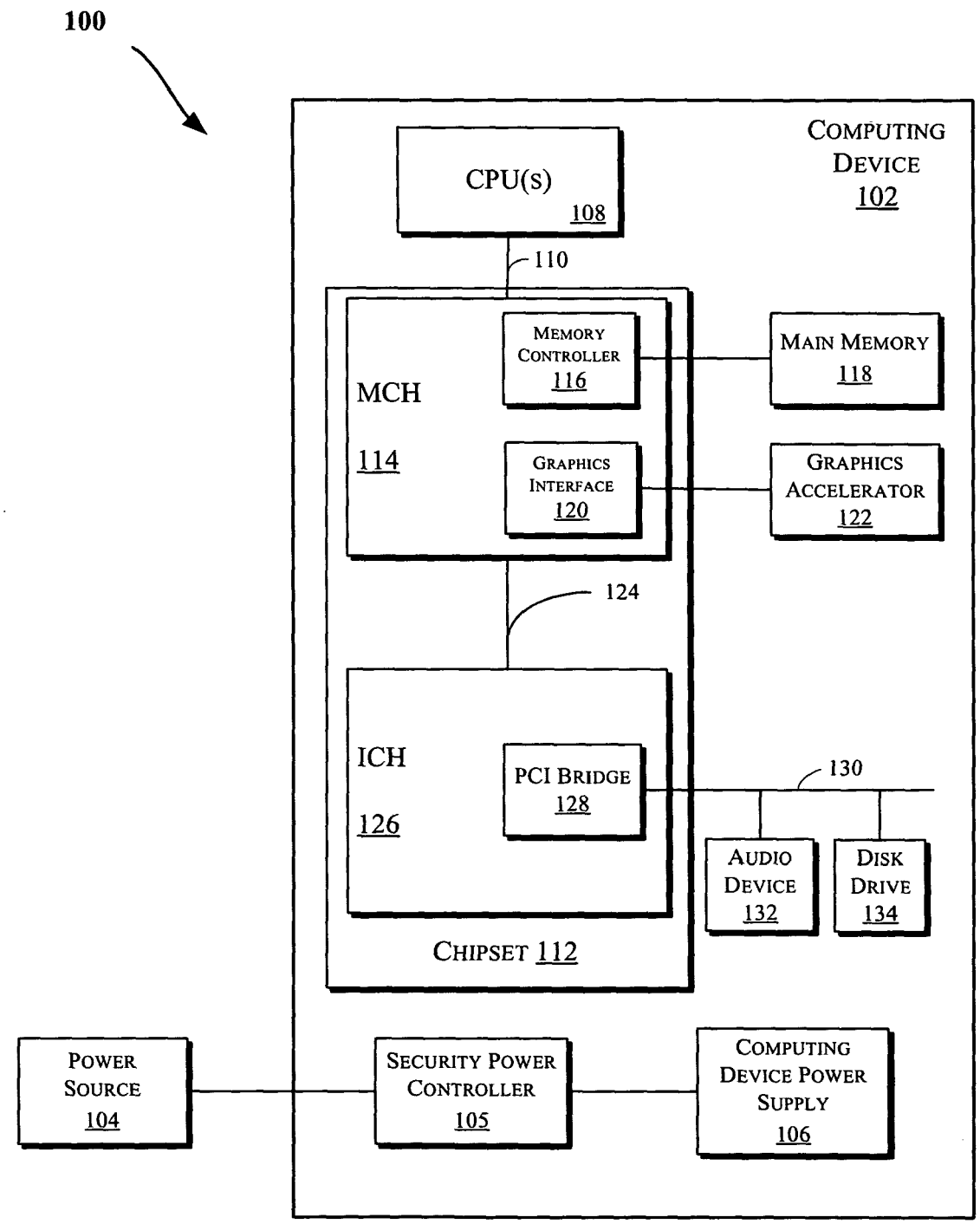
FIG. 1 illustrates a block diagram of a computing system in accordance with an embodiment.

FIG. 1 illustrates a block diagram of a computing system 100 in accordance with an embodiment. The computing system 100 may include a computing device 102. The computing device 102 may be coupled to a power source 104 that provides electrical power to the computing device 102. The power source 104 may be any suitable electrical power source such as a battery, a power adapter (e.g., an external power adapter), a motor vehicle power supply (e.g., supplied through a cigarette lighter outlet or a power outlet of a car, truck, bus, boat, or the like), an airplane power supply, and/or an household or commercial electrical power outlet (e.g., supplying power at voltages including about 110 V or 220 V). The power adapter may be an alternating current/direct current (AC/DC) power adapter, such as those utilized by laptop computers.

The computing device 102 may be any suitable computing device such as a portable computing device, a desktop computing device (e.g., a workstation or a desktop computer), a rack-mounted computing device, or the like. Examples of a portable computing device include a laptop (or notebook) computer, a personal digital assistant, or a mobile phone.

The power source 104 may be coupled to a security power controller 105. The security power controller 105 may be coupled to a computing device power supply 106 to control the supply of electrical power to the computing device 102, as will be further discussed herein, for example, with respect to FIGS. 2-4. Even though FIG. 1 illustrates that the security power controller 105 may be implemented in the same device as the computing device 102 (e.g., on the motherboard of the computing device 102), the security power controller 105 may be implemented in any suitable location. For example, the security power controller 105 may be implemented in the same device as the computing device power supply 106, the power source 104, or the like. Also, the security power controller 105 may be implemented in any suitable location such as integrated with a laptop power adaptor or the like. The computing device power supply 106 may provide electrical power to one or more components of the computing device 102. Also, in some embodiments, the computing device power supply 106 may convert AC power to DC power and/or change the voltage potential supplied to various components of the computing device 102. For example, the computing device power supply 106 may convert an input supply of about 110 VAC to 3-5 VDC.

The computing device 102 may also include one or more central processing unit(s) (CPUs) 108 coupled to a bus (or interconnection network) 110. In one embodiment, one or more processors may be provided on a single integrated circuit (IC) semiconductor die. Hence, the CPU 108 may have a single or multiple core design.

A chipset 112 may also be coupled to the bus 110. The chipset 112 may include a memory control hub (MCH) 114. The MCH 114 may include a memory controller 116 that is coupled to a main system memory 118. The main system memory 118 may store data and sequences of instructions that are executed by the CPU 108, or any other device included in the system 100. In one embodiment, the main system memory 118 includes random access memory (RAM); however, the main system memory 118 may be implemented using other memory types such as dynamic RAM (DRAM), synchronous DRAM (SDRAM), static RAM (SRAM), or the like. Additional devices may also be coupled to the bus 110, such as multiple CPUs and/or multiple system memories.

The MCH 114 may also include a graphics interface 120 coupled to a graphics accelerator 122. In one embodiment, the graphics interface 120 may be coupled to the graphics accelerator 122 via an accelerated graphics port (AGP). In an embodiment, a display (such as a flat panel display) may be coupled to the graphics interface 120 through, for example, a signal converter that translates a digital representation of an image stored in a storage device such as video memory or system memory into display signals that are interpreted and displayed by the display. The display signals produced by the display device may pass through various control devices before being interpreted by and subsequently displayed on the display.

A hub interface 124 may couple the MCH 114 to an input/output control hub (ICH) 126. The ICH 126 may provide an interface to input/output (I/O) devices coupled to the computing system 100. The ICH 126 may be coupled to a peripheral component interconnect (PCI) bus. Hence, the ICH 126 may include a PCI bridge 128 that provides an interface to a PCI bus 130. The PCI bridge 128 may provide a data path between the CPU 108 and peripheral devices. Additionally, other types of I/O interconnect topologies may be utilized. The PCI bus 130 may be coupled to an audio device 132 and one or more disk drive(s) 134. Other devices may be coupled to the PCI bus 130. In addition, the CPU 108 and the MCH 114 may be combined to form a single chip. Furthermore, the graphics accelerator 122 may be included within the MCH 114 in other embodiments.

Additionally, other peripherals coupled to the ICH 126 may include, in various embodiments, integrated drive electronics (IDE) or small computer system interface (SCSI) hard drive(s), universal serial bus (USB) port(s), a keyboard, a mouse, parallel port(s), serial port(s), floppy disk drive(s), digital output support (e.g., digital video interface (DVI)), or the like. Hence, the computing device 102 may include volatile and/or nonvolatile memory.

Figure 2:
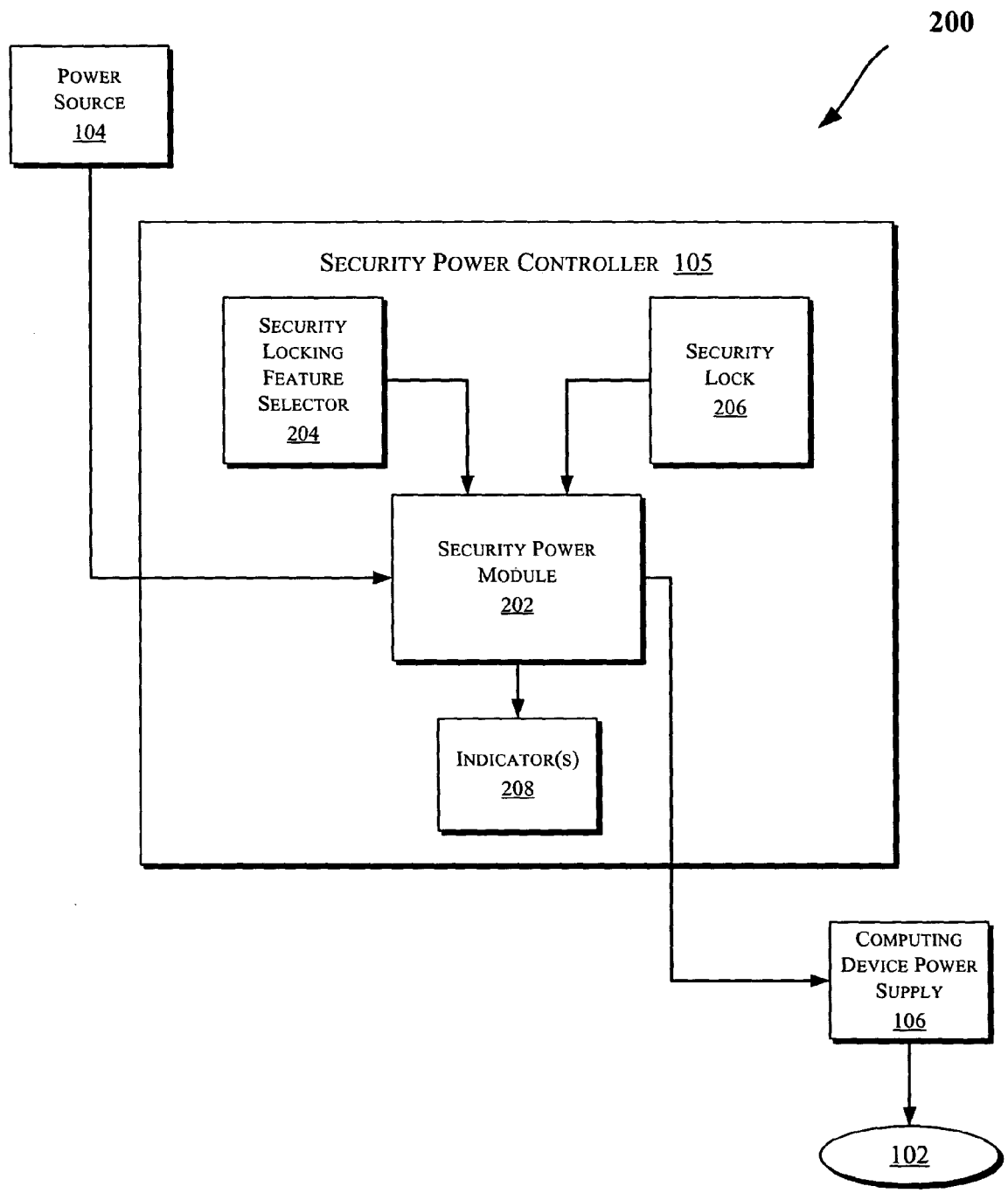
FIG. 2 illustrates a block diagram of an embodiment of a security power controller system.

FIG. 2 illustrates a block diagram of an embodiment of a security power controller system 200. In one embodiment, the system 200 may be utilized in the computing system 100 of FIG. 1 to control the supply of power to various components of the computing device 102 of FIG. 1. In an embodiment, the direction of arrows in FIG. 2 may indicate the direction of power flow in the system 200. For example, electrical power may flow from the power source 104 to a security power module 202 (e.g., within the security power controller 105). Also, as will be further discussed herein with respect to FIGS. 3 and 4, depending on one or more inputs (such as signals from a security locking feature selector 204 and/or a security lock 206), the security power module 202 may enable/disable the supply of electrical power from the power source 104 to the computing device power supply 106. Hence, the security power module 202 may enable/disable the supply of electrical power to some of the components of the computing device 102.

Figure 3:
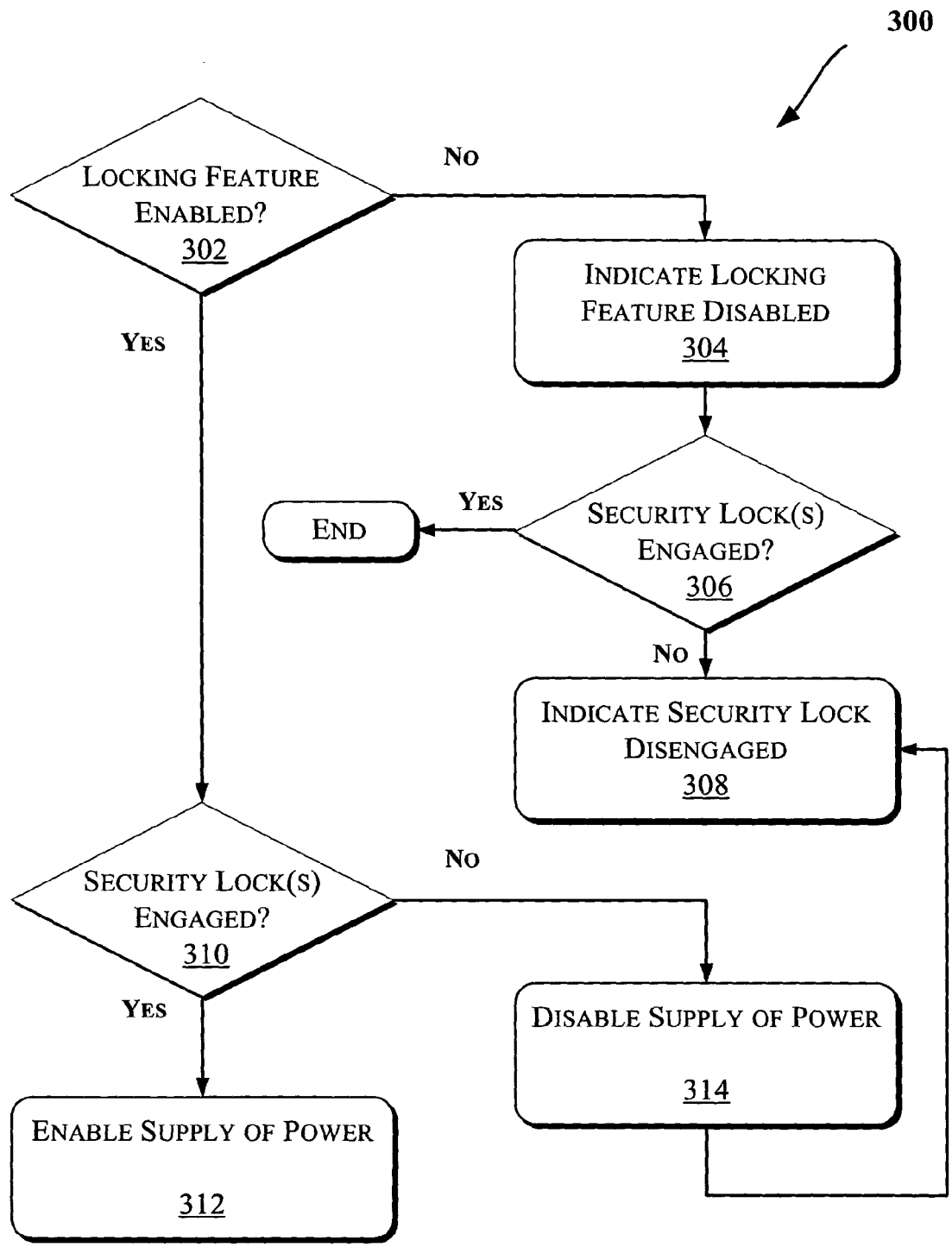
FIG. 3 illustrates an embodiment of a method for controlling supply of electrical power to a computing device.
Figure 4:
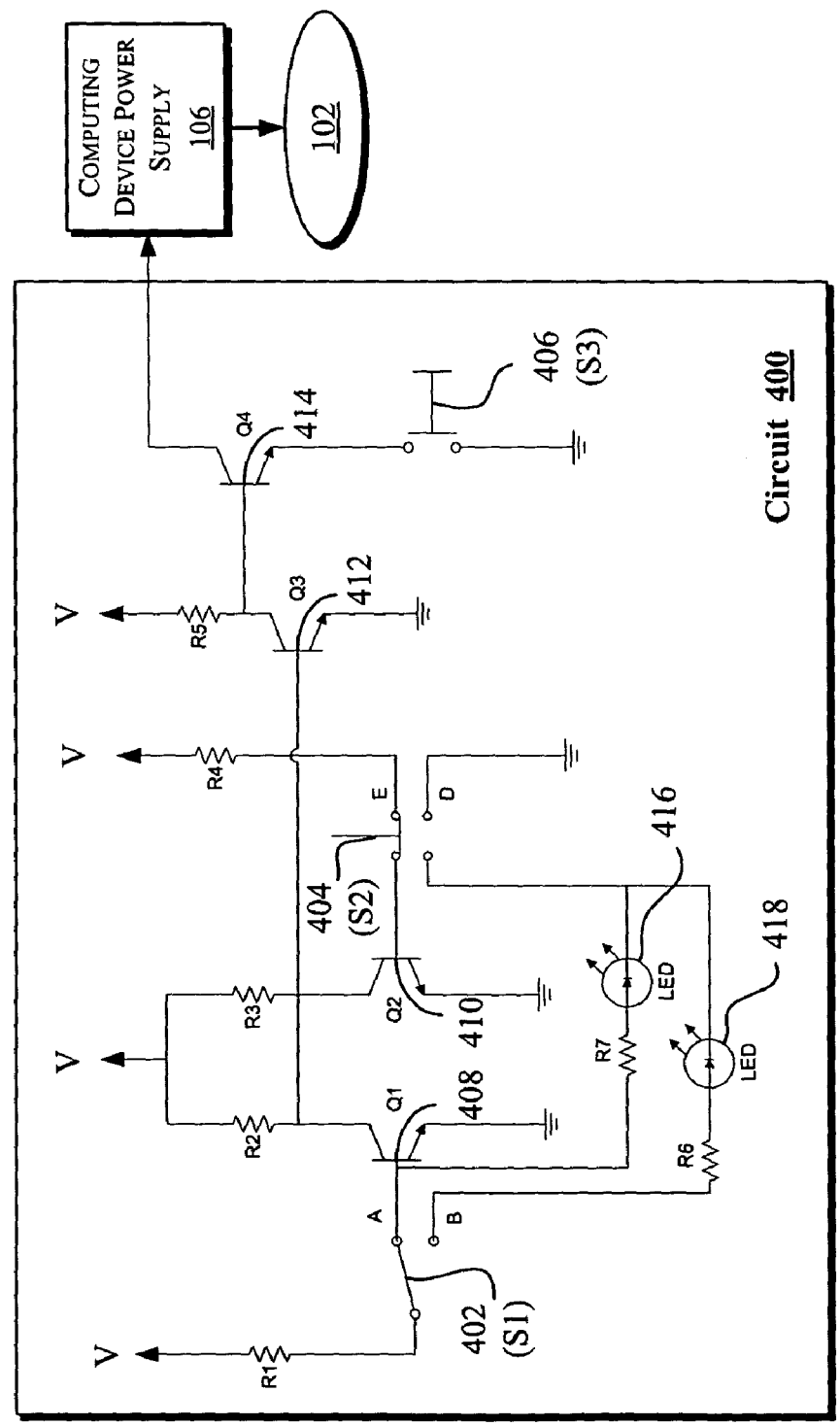
FIG. 4 illustrates an embodiment of a circuit that may be utilized to control supply of electrical power to a computing device.

In one embodiment, the security locking feature selector 204 may be a manual selector or switch that may be operated by a user to control the state of the security power feature, as will be further discussed with respect to FIGS. 3 and 4. In a first position, the selector 204 may indicate that the security power module 202 is to take the engagement status of the security lock 206 into account when determining whether to enable or disable the supply of electrical power to the computing device power supply 106. In a second position (e.g., opposite of the first position), the selector 204 may indicate that the security power module 202 is to ignore the status of the security lock 206. Hence, the second position may allow the power source 104 to continuously provide power to the computing device power supply 106. Also, in one embodiment, the security locking feature selector 204 may be optional and the security locking feature may be continuously enabled.

In an embodiment, the security lock 206 may be a lock that physically engages the chassis of the computing device 102 of FIG. 2. The security lock 206 may also be attached to a stationary object, e.g., via a cable attached to a wall, a desk, cabinets, etc. Accordingly, when the security lock 206 engages the computing device 102, the computing device 102 may not be readily removed from its location, e.g., without using physical force. Also, the security lock 206 may have any suitable locking mechanism such as a combinational lock, a keyed lock, a biometric lock (e.g., that utilizes biometric features such as fingerprints to identify a user), or the like.

In one embodiment, the security locking feature selector 204 may be utilized for securing multiple devices, e.g., the computing device 102, various peripherals coupled to a computing device such as a display, an MP3 player, other devices discussed with reference to FIG. 1, or the like. Also, the security power module 202 may receive signals from multiple security locks 206 to determine whether the supply of electrical power is to be enabled or disabled. In one embodiment, the signals received from multiple security locks 206 may be logically combined (e.g., via an AND gate) to determine whether the supply of electrical power is to be enabled or disabled. For example, if all the security locks (206) are not engaged, the security power module 202 may disable the supply of electrical power to the computing device power supply.

As illustrated in FIG. 2, the security power module 202 may be coupled to one or more indicators 208, e.g., to provide feedback to a user about whether the security locking feature (204) is enabled and/or whether the security locks (206) of one or more devices are to be engaged, as will be further discussed with reference to FIGS. 3 and 4. The indicators 208 may indicate the status of the security locking feature selector (204) and/or the security locks (206). The indicators 208 may be one or more audible indicators, visual indicators, or combinations thereof. Hence, the indicators 208 may provide indicia visually, audibly, or audio-visually. For example, the indicators 208 may be light emitting diodes (LEDs) and/or audio speakers. In an embodiment, one indicator 208 may be provided for each device that is to be secured by a security lock (206). Also, the indicators 208 may be provided by sending a message to a user display device. For example, if the security locking feature is disabled, the security power module 202 may send a signal to a computing device (102) (e.g., through the device's basic input output system (BIOS)) to display a message on a user display device that the security locking feature is disabled.

FIG. 3 illustrates an embodiment of a method 300 for controlling supply of electrical power to a computing device. In one embodiment, the method 300 may be utilized for controlling supply of electrical power to the computing device 102 of FIG. 2. Also, the system 200 of FIG. 2 may be utilized to perform various stages of the method 300.

A stage 302 may determine whether a security locking feature of a computing device is enabled. If the security locking features is disabled, an indicia may be provided (304), e.g., by the indicators 208 of FIG. 2. A stage 306 may determine whether the security lock (206) is engaged. If the security lock is engaged, the method 300 ends. Otherwise, if the security lock is disengaged, a stage 308 may provide an indicia. As discussed with reference to FIG. 2, the security power module 202 may determine via signals it receives from the security locking feature selector 204 and/or the security lock 206 whether the security locking feature is enabled or the security lock 206 is engaged.

Alternatively, if the stage 302 determines that the locking feature is enabled, a stage 310 may determine if one or more security locks are engaged. For example, the security power module 202 may determine via one or more signals it receives from the security lock(s) 206 whether the security lock(s) are engaged (306). If the security lock(s) are engaged (310), the supply of power may be enabled (312), e.g., the security power module 202 may enable the supply of power from the power source 104 to the computing device power supply 106. Hence, the method 300 may further enable the supply of electrical power to the one or more components of the computing device once the security lock is engaged with the security locking feature enabled.

Otherwise, if the stage 310 determines that the security lock is disengaged, the supply of power may be disabled (314), e.g., by the security power module 202. Disabling the supply of electrical power may be provided by a security power module (202) decoupling a power source (104) from a computing device power supply (106). Also, the method 300 may provide indicia that one or more security locks are disengaged (308) if the security locks are disengaged (310) and the security locking feature is enabled (302).

Hence, the method 300 may disable the supply of electrical power to one or more components of a computing device (102) as long as one or more security locks (206) are disengaged and a security locking feature (e.g., as indicated by the selector 204) is enabled. As discussed with reference to FIG. 2, the security locking feature selector 204 may be optional and the security locking feature may be continuously enabled. Therefore, the stages 302-306 may be optional in one embodiment.

FIG. 4 illustrates an embodiment of a circuit 400 that may be utilized to control supply of electrical power to a computing device. In one embodiment, the circuit 400 may be utilized to control the supply of electrical power to the computing device 102 of FIG. 2, e.g., through the computing power supply 106. Also, the circuit 400 may be utilized to perform various stages of the method 300 of FIG. 3. In an embodiment, the security power module 202 of FIG. 2 may be implemented by the circuit 400.

The circuit 400 includes three selectors (402-406). The selector (or switch) 402 (S1) may be the security locking feature selector 204 of FIG. 2. In position A, the selector 402 disables the security locking feature that was discussed with respect to FIGS. 2 and 3. In position B, the selector 402 enables the security locking feature. In an embodiment, selection of the selector 402 may provide a signal to perform the stage 302 of FIG. 3. The selector (or switch) 404 (S2) may be the security lock 206 of FIG. 2. In position E, the selector 404 indicates that the security lock 206 has been engaged. In position D, the selector 404 indicates that the security lock 206 is disengaged. In an embodiment, selection of the selector 404 may provide a signal to perform the stages 306 and/or 310 of FIG. 3. Also, as discussed with reference to FIG. 2, multiple security locks 206 may be coupled to the security power module 202. Hence, multiple selectors may be coupled to provide the selector 404. In one embodiment, the selector 404 may be in position E (i.e., turning on the transistor 410) when all the multiple security locks 206 are engaged. The selector (or switch) 406 (S3) may be a computing device (102) power button.

In position A, the selector 402 turns on a transistor 408. If the selector 404 is in position E, a transistor 410 is also on. Hence, a transistor 412 will be off. When the transistor 412 is turned off, a transistor 414 is turned on, allowing the selector 406 to control the flow of power to the computing device power supply 106. In an embodiment, when the security locking feature is disabled (the selector 402 is in position A) and the security lock (206) is engaged, the supply of electrical power to components of the computing device 102 is controlled by the power button 406. Also, the transistors 408-412 may be any suitable transistor including a power transistor, such as a field effect transistor (FET), a metal oxide silicon FET (MOSFET), or the like. In one embodiment, having the security locking feature disabled and the security lock engaged allows the computing device (102) to operate, e.g., without activating any indicators (208).

In position A, the selector 402 turns on a transistor 408. If the selector 404 is in position D, the transistor 410 will be off. Hence, the transistor 408 will pull down the gate of the transistor 412, turning off the transistor 412. When the transistor 412 is turned off, the transistor 414 is turned on, allowing the selector 406 to control the flow of power to the computing device power supply 106. Hence, when the security locking feature is disabled (the selector 402 is in position A) and the security lock (206) is disengaged (the selector 404 is in position D), the supply of electrical power to components of the computing device 102 is controlled by the power button 406. Also, as illustrated in FIG. 4, with the selector 404 in position D and the selector 402 in position A, the indicator 416 (which may be an LED in one embodiment) is turned on to indicate that the security lock (206) is disengaged (e.g., as discussed with reference to the stages 308 of FIG. 3). Accordingly, when a user disengages the lock 206, e.g., to move a computing device (102) to a different location, an indicator (208, 416) may remind the user that the security lock (206) is disengaged. Also, in one embodiment, an indicia may be provided when it is determined that the locking feature is disabled (e.g., such as discussed with reference to the stage 304 of FIG. 3). Such an embodiment may be provided by coupling an indicator (e.g., a LED in an embodiment) between position A of the selector 402 and ground (not shown). As illustrated in FIG. 4, various suitable resistors may be utilized in the circuit 400, e.g., to divide currents or voltages. Hence, the indicator coupled between position A of the selector 402 and ground may also be coupled to a suitable resistor in series. Moreover, the power supplied to the circuit 400 may have any suitable voltage level such as about 3 VDC or 5 VDC.

In position B, the selector 402 turns off the transistor 408. If the selector 404 is in position D, the transistor 410 will be off. Hence, the transistor 412 will be on, turning off the transistor 414. When the transistor 414 is turned off, the selector 406 is disengaged from the computing device power supply 106 resulting in, no power being supplied to the computing device 102. Hence, when the security locking feature is enabled (the selector 402 is in position B) and the security lock (206) is disengaged (the selector 404 is in position D), the supply of electrical power to components of the computing device 102 is disabled. Also, as illustrated in FIG. 4, with the selector 404 in position D and the selector 402 in position B, an indicator 418 (which may be an LED in one embodiment) is turned on to indicate that the security lock (206) is disengaged (e.g., as discussed with reference to the stage 308 of FIG. 3). Accordingly, when a user disengages the lock 206 with the security locking feature enabled, e.g., to move a computing device (102) to a different location, an indicator (208, 418) reminds the user that the lock (206) is disengaged and the computing device will not turn on.

In position B, the selector 402 turns off the transistor 408. If the selector 404 is in position E, the transistor 410 will be on. Hence, the transistor 412 will be pulled down by the transistor 410, turning off the transistor 412, resulting in the transistor 414 being turned on. When the transistor 412 is turned off, the transistor 414 is turned on, allowing the selector 406 to control the flow of power to the computing device power supply 106. Hence, when the security locking feature is enabled (the selector 402 is in position B) and the security lock (206) is engaged (the selector 404 is in position E), the supply of electrical power to components of the computing device 102 is controlled by the power button 406. Accordingly, when a user engages the lock 206 with the security locking feature enabled, electrical power will be supplied to the computing device power supply 106 depending on the position of the selector 406.

Reference in the specification to "one embodiment" or "an embodiment" means that a particular feature, structure, or characteristic described in connection with that embodiment may be included in an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. An apparatus comprising:
   a security power controller to:
   determine an engagement status of a security lock for a computing device, wherein the security lock is to comprise a locking mechanism through which the security lock is to engage the computing device to limit physical removal of the computing device; and
   disable a supply of electrical power to one or more components of the computing device based at least in part on the engagement status of the security lock,
   wherein the security power controller is to comprise a first transistor to provide a first signal indicative of a state of a security locking feature;
   a second transistor to provide a second signal indicative of the engagement status of the security lock; and
   a third transistor coupled to the first and second transistors to receive the first and the second signals and to provide a third signal to control the supply of electrical power to one or more components of the computing device.

2. The apparatus of claim 1, further comprising a security locking feature selector to indicate whether the security power controller is to consider the engagement status of the security lock when the security power controller disables the supply of electrical power to the one or more components of the computing device.

3. The apparatus of claim 1, wherein the security power controller comprises a security power module, the apparatus further comprising:
   a power source; and
   a power supply for the computing device, the power supply to couple to the power source through the security power module.

4. The apparatus of claim 1, further comprising one or more indicators coupled to the security power controller to provide the engagement status of the security lock or a status of a security locking feature.

5. The apparatus of claim 4, wherein the one or more indicators are one or more visual indicators, audible indicators, or combinations thereof.

6. The apparatus of claim 3, wherein the power source comprises an alternating current/direct current (AC/DC) power adapter coupled to the security power module to provide the supply of the electrical power.

7. The apparatus of claim 1, wherein the security power controller and the computing device are implemented in a same device.

8. The apparatus of claim 1, wherein the computing device is a portable computing device.

9. The apparatus of claim 8, wherein the portable computing device is a laptop computer, a personal digital assistant, or a mobile phone.

10. The apparatus of claim 1, wherein in response to disengagement of the security lock, the security power controller is to cause transmission of a signal, through a basic input output system (BIOS) of the computing device, to cause display of a message on a user display device.

11. A method comprising:
    determining an engagement status of a security lock for a computing device, wherein the security lock is to comprise a locking mechanism through which the security lock is to engage the computing device to limit physical removal of the computing device; and
    disabling a supply of electrical power to one or more components of the computing device based at least in part on the engagement status of the security lock,
    wherein a first transistor is to provide a first signal indicative of a state of a security locking feature;
    a second transistor to provide a second signal indicative of the engagement status of the security lock; and
    a third transistor coupled to the first and second transistors to receive the first and the second signals and to provide a third signal to control the supply of electrical power to one or more components of the computing device.

12. The method of claim 11, further comprising providing one or more indicia indicative of the engagement status of the security lock or a status of a security locking feature.

13. The method of claim 11, wherein the disabling the supply of electrical power occurs as long as a plurality of security locks are disengaged and a security locking feature is enabled.

14. The method of claim 11, wherein the disabling the supply of electrical power comprises decoupling a power source from a computing device power supply.

15. A system comprising:
    a nonvolatile memory device coupled to a computing device to store data; and
    a security power controller to:
    determine an engagement status of a security lock for a computing device, wherein the security lock is to comprise a locking mechanism through which the security lock is to engage the computing device to limit physical removal of the computing device; and
    disable a supply of electrical power to one or more components of the computing device based at least in part on the engagement status of the security lock,
    wherein the security power controller is to comprise a first transistor to provide a first signal indicative of a current state of a security locking feature;
    a second transistor to provide a second signal indicative of the engagement status of the security lock; and
    a third transistor coupled to the first and second transistors to receive the first and the second signals and to provide a third signal to control the supply of electrical power to one or more components of the computing device.

16. The system of claim 15, wherein the computing device comprises volatile memory comprising one or more of RAM, DRAM, SRAM, or SDRAM.

17. The system of claim 15, wherein the nonvolatile memory device is one of a hard drive or a floppy disk drive.

18. The system of claim 15, wherein the security power controller comprises a security power module, the system further comprising:
    a power source; and
    a power supply for the computing device, the power supply to couple to the power source through the security power module.

19. The system of claim 15, further comprising one or more indicators coupled to the security power controller to provide the engagement status or a status of the security lock of a security locking feature.

20. The system of claim 15, further comprising a security locking feature selector to indicate whether the security power controller is to consider the engagement status of the security lock when the security power controller disables the supply of electrical power to the one or more components of the computing device.

* * * * *